Nov. 22, 1960    J. C. NEWLIN    2,961,260
ADJUSTABLE COLUMN
Filed Dec. 15, 1958    3 Sheets-Sheet 1

Inventor:
John C. Newlin,
by Just & Oish
Attorneys.

Nov. 22, 1960   J. C. NEWLIN   2,961,260
ADJUSTABLE COLUMN
Filed Dec. 15, 1958   3 Sheets-Sheet 2
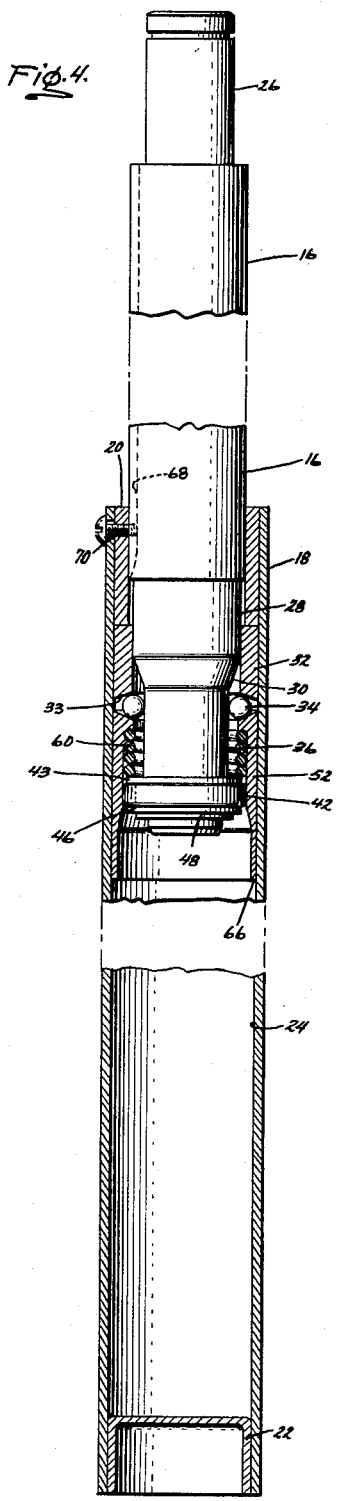
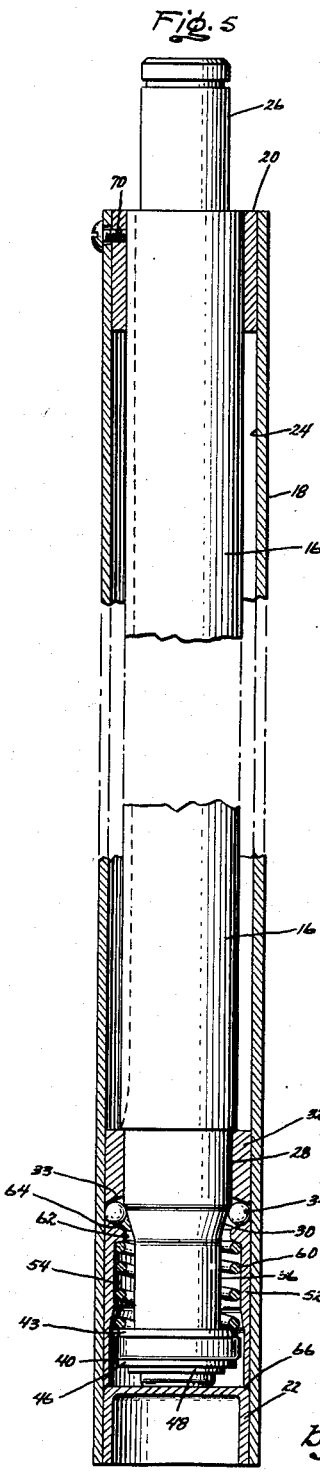
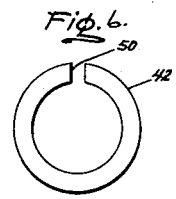
Inventor:
John C. Newlin,
by Just & Irish
Attorneys.

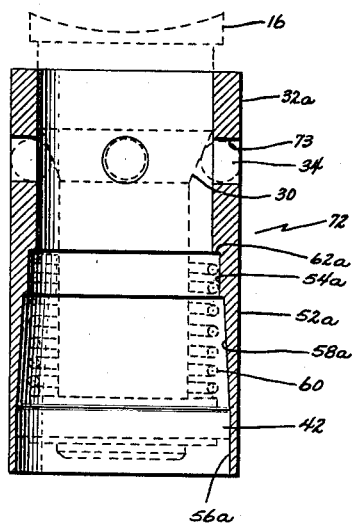

United States Patent Office 2,961,260
Patented Nov. 22, 1960

2,961,260

ADJUSTABLE COLUMN

John C. Newlin, Auburn, Ind., assignor to Garrett Tubular Products, Inc., Garrett, Ind.

Filed Dec. 15, 1958, Ser. No. 782,345

14 Claims. (Cl. 287—58)

The present invention relates to an adjustable column for a stool or the like and more particularly to an adjustable support composed of a pair of telescoping members having locking means for selectively securing the members in any desired extended length. This is a continuation-in-part of my co-pending application Serial Number 722,766, filed March 20, 1958 now abandoned.

This adjustable column is particularly useful in stools for the purpose of varying the supported height of the seat with respect to the floor. This column, however, may be used in any structural environment in which an adjustable extensible column locked against collapse is desired. Such a column has use in connection with towers, tables, furniture or as chair legs, and other uses as will occur to persons skilled in the art.

The stool or similar supported device incorporating this invention is provided with two telescoping members, with one of said members secured to the seat and the other of said members secured to the stool legs or base. A locking mechanism is interposed between the two members, which is operable to permit adjustment of the two members with respect to each other and to hold or lock the two members in such adjusted position. This locking means is also provided with automatically operable unlocking means whereby the two members may be collapsed completely, one inside the other, for reducing the length of the column to a minimum.

A still further feature incorporated in the locking mechanism is an arrangement for returning automatically the locking mechanism to its normal operating condition, whereby the extension adjustment as previously explained may be obtained.

This invention constitutes an improvement over that disclosed and claimed in Shearman et al. application, Serial No. 722,066, entitled "Extensible Column for a Stool or the Like," filed on March 20, 1958 now Patent No. 2,872,223. The extensible column of this prior application utilizes a tripping mechanism for permitting collapse of the column, which comprises an enlarged portion of precise diameter which may be frictionally gripped by a slotted locking sleeve for unlocking the column and permitting it to be collapsed. Such a construction requires that the diameter of the enlarged portion be precisely controlled in manufacture so that it will present the permitted and necessary frictional gripping action with the locking sleeve in order to permit collapse of the column, but because of the critical tolerance requirement in the dimensions of this enlarged portion and the engaging portion of the locking sleeve, considerable expense is incurred in the required machining operations. Still further, even though the critical tolerance requirements are met, a period of usage will result in wearing of these surfaces which results in the locking sleeve not being able to grip the enlarged portion with enough frictional force to release the locking mechanism and to collapse the column.

In manufacturing, if the diameter of the enlarged portion is made too small, then sufficient frictional gripping force with the locking sleeve for the purpose of unlocking the mechanism cannot be obtained. Still further, if the enlarged portion is too large in diameter, it is impossible to cause frictional engagement with the locking sleeve whereupon it is impossible to collapse the column.

Still another feature in the construction of the above prior application which can interfere with the proper operation is the fact that the locking mechanism utilizes a series of annularly arranged balls which lockingly engage cam surfaces on the inner and outer telescoping members for securing the column against collapse. However, by rotating the inner and outer telescoping members relative to each other while applying a collapsing force, it is possible to cause the column to shorten, the inner and outer members while rotating following spiralling movement toward collapsing direction. The locking mechanism thus does not serve its intended purpose of securing the column against collapse in all instances.

It is an object of this invention to provide an adjustable column for a stool or the like, which is an improvement over the prior device by overcoming the disadvantages just explained.

It is still another object of this invention to provide an adjustable column which is foolproof in operation, economical to manufacture and possesses a long wearlife.

Other objects will become apparent as the description proceeds.

To the accomplishment of the above and related objects, the invention may be embodied in the forms illustrated in the accompanying drawings, attention being called to the fact, however, that the drawings are illustrative only, and that specific change may be made in the specific constructions illustrated and described, so long as the scope of the appended claims is not violated.

In the drawings:

Fig. 4 is a view similar to Fig. 2 but with the telescoping members extended to the maximum limit and the locking means moved to inoperative position preparatory to collapsing the two telescoping members;

Fig. 5 is a sectional view similar to Fig. 4 but with the telescoping members completely collapsed and the locking mechanism returned to its operable position;

Fig. 6 is an illustration of the split locking ring which serves in holding the locking mechanism in unlocked position; and Fig. 7 is a fragmentary cross-sectional view illustrating a different embodiment of my invention.

Figure 1:
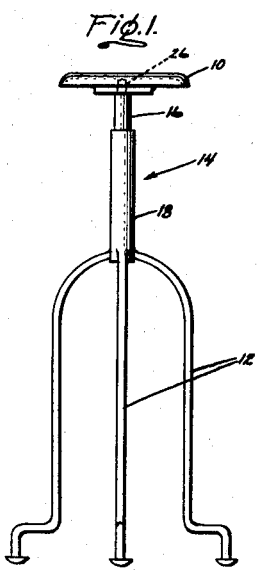
Fig. 1 is a side elevation of a stool incorporating the present invention.
Figure 3:
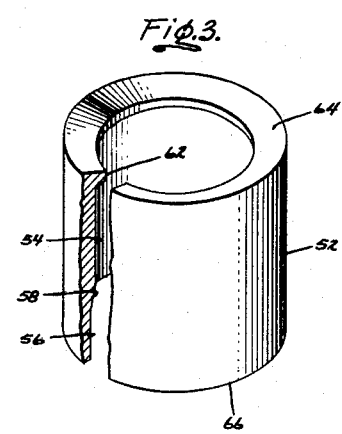
Fig. 3 is a perspective view of the locking sleeve partially sectioned for clarity of illustration.
Figure 2:
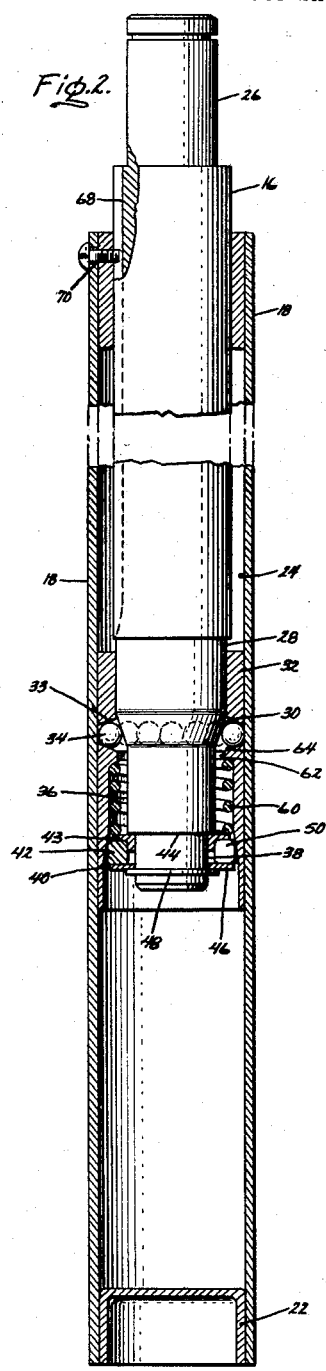
Fig. 2 is a longitudinal sectional illustration of the adjustable column.

Referring to the drawings, and more particularly to Figs. 1 and 2, the stool is shown as having a seat 10 and legs 12, and an extensible support 14 connected therebetween. The extensible support 14 comprises two telescoping members 16 and 18 provided with a locking mechanism (to be described hereinafter) which permits raising the seat 10 to any desired height within the limits of extension of the column 14. The supported height of the seat 10 is fixed merely by a slight downward force which serves to actuate the locking mechanism, preventing the collapse of the telescoping members 16 and 18.

The extensible column 14 is shown more clearly in Fig. 2. The outer member 18 is tubular and preferably formed of cold rolled steel. In the opposite ends of the outer member 18 are fixed two tubular sleeves or abutments 20 and 22, respectively, which are involved in the operation of the locking mechanism to be explained in the following. The abutment 22 is preferably cup-shaped as shown, but may be a sleeve of substantially the same form as the sleeve 20. The inner wall of the tubular member 18 is preferably smooth, but the degree of smoothness is not critical.

The inner member 16 is constructed to be freely, axially movable in the column 18. The upper end of the inner member 16 is reduced in diameter at 26 for providing an attachment for the stool seat 10.

Intermediate the ends of the inner member 16 is a reduced diameter portion 28 having on its lower end a frusto-conical cam surface 30 which extends radially inwardly from the periphery of the portion 28. Interposed between this portion 28 and the outer member 18 is a tripping sleeve 32 of such size as to be freely movable with respect to both the outer member 18 and the portion 28 (of inner member 16).

An annular series of steel balls or rolling elements 34 surround the cam surface 30 and are of such diameter as to be wedged or locked between this cam surface and the inner wall 24 of the outer member 18 when the inner column member 16 is forced in the collapsing direction.

Axially extending from the lower or right-hand end (as viewed in Fig. 2) of the cam surface 30 is an extension 36 of smaller diameter than the portion 28, the lower or right-hand extremity of this extension 36 being reduced still further in diameter at 38 to receive a locking ring assembly as generally indicated by the numeral 40. This locking ring assembly 40 comprises a split ring 42 as shown in Fig. 6 made of spring steel and having an axial extent adequate to provide the frictional gripping force as will be explained in more detail in the following. This locking ring is centered on the extremity 38 by means of a centering washer 43 having right angle flanges as shown, this washer abutting the shoulder 44 between the extremity 38 and the extension 36 for preventing the locking ring 42 from sliding over the extension 36.

A second washer 46 abuts the lower or right-hand end of the lock ring 42 and is secured in place by means of a snap ring 48 on the extremity 38. The lock ring 42 is provided with an inner diameter slightly larger than the outer diameter of the centering portion of the washer 43 so that the lock ring may be radially compressed for reducing the circumference thereof. Also, the split 50 in the ring 42 is made wide enough to permit an adequate radial compression of the ring 42 as will appear in the following.

Surrounding the extension 36 and the locking ring assembly 40 is a locking sleeve 52 which is freely, axially slidable in the outer member 18. The inner wall of this sleeve 52 is divided into two different diameter lengths 54 and 56, which are joined by a 5° tapered or chamfered surface 58. The diameter 56 is large enough to have a clearance fit with the locking ring 42. This being true, the sleeve 52 is free to move relative to the locking ring when the sleeve portion 56 is in radial alignment therewith.

The sleeve length 54, however, is smaller in diameter than the portion 56, this diameter being slightly smaller than the outer diameter of the locking ring 42. Thus, when the sleeve portion 54 is moved or telescoped over the locking ring 42 an interference or frictional fit results which locks the sleeve 52 onto the ring 42, which in turn locks the sleeve to the inner member 16. Thus, the portion 54 of the sleeve 52 is said to have an interference frictional fit with respect to the locking ring, while the sleeve length 56 is said to have a clearance fit therewith.

Surrounding the extension 36 of the inner member 16 is a compressed helical spring 60 which bears at one end against the centering washer 43 and at the other end against a radially inwardly projecting shoulder 62 on the upper end of the locking sleeve 52. The upper surface 64 of this ridge is conically tapered and normally engaged with the balls 34. This tapered surface 64 normally urges the balls 34 radially inwardly toward the center of the inner member 16. The spring 60 maintains the sleeve 52 in normal engagement with the balls 34.

The balls 34 are straddled by the two sleeves 32 and 52, both of these sleeves having conically tapered ends 33 and 64, respectively, which urge the balls radially inwardly.

The spring 60 need only be strong enough to hold the sleeve surface 64 into engagement with the balls and should have a compressed height which will allow the balls to be moved into the annular space surrounding the extension 36 and the outer member 18.

Since the locking ring 42 has a free outer diameter which is slightly larger than the inner diameter of the sleeve length 54, as the sleeve 52 is forced over the ring 42, the latter will be compressed radially inwardly but will exert a spring force outwardly causing frictional engagement with the inner diameter portion 54 of the sleeve 52. The ring 42 is of sufficient cross-section and strength that it will exert a sufficient force to grip frictionally the surface 54 but will not exert too great a force as will interfere with the proper telescoping movement of the sleeve 52. The dimension tolerances in the outer diameter of the ring 42 and the inner diameter of the sleeve section 54 are not critical, since the ring 42 may be radially compressed as already explained. The importance of this feature will become apparent from the following explanation.

With the extensible column as described used in the stool construction of Fig. 1, the column will be upright with the inner member 16 uppermost and the outer member 18 lowermost. The stool is adjusted to a higher, fixed level merely by pulling upwardly on the inner member 16 and then releasing the seat when the desired height has been reached. The member 16 tends to fall downwardly under the force of gravity, but this is prevented by the wedge-locking effect of the balls 34 between the cam surface 30 and the inner wall 24 of the outer member 18. This raising or extending adjustment may be continued until the inner member 16 is fully extended to the position where the upper end of the tripping sleeve 32 meets the lower end of the abutment sleeve 20.

If it is desired to lower the seat 10, the inner member 16 is fully extended to the position shown in Fig. 4. The seat 10, or in other words, the inner member 16 in such extended position has the upper end of the tripping sleeve 32 engaged with the lower end of the abutment sleeve 20. Further upward movement of the inner member 16 results in relative movement between the sleeve 32 and the reduced diameter portion 28, which relative movement forces the balls 34 into the annular space between the extension 36 and the outer member 18. Since this annular space is larger than the diameter of the balls, the mechanism is unlocked, permitting the inner and outer members to be fully collapsed.

In addition to the balls 34 being forced into retracted or inoperative position, the locking sleeve 52 is also forced downwardly with the smaller diameter portion 54 frictionally sliding or telescoping over the outer surface of the locking ring 42. The interference fit which thus results is such that the sleeve and locking ring frictionally lock together, the force of the return spring 60 being insufficient to break this frictional lock.

With the assembly so locked in retracted or inoperative position, the inner member 16 may be freely lowered or collapsed into the outer member 18. At the limit of the collapsing movement, the lower end 66 of the sleeve 52 engages the upper end of the abutment 22, and by exerting a slight downward or collapsing force on the inner member 16, the sleeve 52 may be forced upwardly relative to the locking ring 42 until the interference fit is broken. This frees the sleeve 52 whereupon the spring 60 forces the balls 34 as well as the sleeve 32 upwardly until the balls enter the wedge-shaped annular space between the cam surface 30 and the outer member 18. The column 16 may once again be incrementally raised to any adjusted position within the structural limits of the mechanism.

Assuming that the inner and outer members are locked in operative position, and are extended a given distance, it is possible to shorten the column merely by rotating the inner and outer members 16 and 18 relative to each other while exerting a downward force on the inner member 16. The balls 34, during such rotation, roll between the cam surface 30 and outer member 18 and thereby spiral downwardly under the force exerted on the end of the member 16. This collapsing action is prevented by providing a longitudinally extending groove 68 in the inner member 16 which is engaged by a screw or key 70 threaded through the wall of the outer member 18 and entered into the groove 68. A clearance fit is provided between this screw 70 and the walls of the groove 68 whereby the inner and outer members 16 and 18 may be telescoped but cannot be rotated relative to each other. Thus, the column cannot be collapsed by causing rotation of the two members 16 and 18 relative to each other.

It has been found that in certain instances, the above-described construction, as illustrated in the previous figures, tends to "lock-up" when the inner member 16 is rapidly moved from its upper fully extended position, as shown in Fig. 4, toward its lower position, as shown in Fig. 5, in order to effect lowering of the seat 10 as previously described. This unintentional "locking-up" is caused by the fact that the tripping and locking sleeve members 32, 52 are separate elements, and thus, when the inner member 16 is rapidly pushed downwardly thus carrying the locking sleeve member 52 downwardly by virtue of the frictional engagement of the locking ring 42 therewith, friction between the inner wall of the outer member 18 and the tripping sleeve 32 may cause the tripping sleeve to lag behind the locking sleeve 52 to widen the space between the two sleeves and in turn permitting one or more of the balls 34 to bounce or roll into the space between the cam surface 30 and the inner wall of the outer member 18 causing sudden locking of the inner member 16 to the outer member 18 before it has reached its lowermost position. In order to eliminate this occasional tendency for the assembly previously described to "lock-up," I have provided the arrangement shown in Fig. 7, in which like elements are indicated by like reference numerals. Here, the tripping and locking sleeve members 32 and 52 are integrally formed as a unitary sleeve member 72. A plurality of circumferentially spaced openings 73 are formed in the sleeve member 72 which respectively retain the balls 34; the portion of sleeve member 72 above holes 73 forms the tripping or releasing section 32a while the portion below the holes 73 forms the locking section 52a. Here, it will be seen that the locking section 52a again has its inner wall axially divided into two different diameter lengths 54a and 56a joined by a tapered or chamfered surface 58a, the larger diameter length 56a having a clearance fit with the locking ring 42 and with the smaller diameter length 54a having an interference or frictional fit with the locking ring 42. It will also be seen that a shoulder 62a is formed on the inner wall of the locking section 52a adjacent holes 73 with the compressed helical spring 60 again being arranged beween the shoulder 62a and the locking ring 42.

It will now be seen that when the inner member 16 is moved to its uppermost position causing tripping section 32a to engage abutment 20, locking ring 42 will again move into frictional engagement with the chamfered surface 58 and smaller diameter length 54a of locking section 52a, and that by virtue of the relative downward movement of the sleeve member 72 with respect to the cam surface 30, balls 34 will be moved and held out of locking engagement therewith. It will further clearly be seen that when the inner member 16 is thereafter moved downwardly toward its lowermost position, balls 34 are positively retained in their unlocked position by virtue of the integral connection of tripping section 32a and locking section 52a, and that it is thus impossible for one or more of the balls 34 to lag behind the locking section 52a and inadvertently to become wedged between the cam surface 30 and the inner surface of the outer member 18 thereby inadvertently to "lock-up" the assembly at a point intermediate its uppermost and lowermost positions.

While I have described and illustrated particular embodiments of my invention, further modifications and improvements will become apparent to those skilled in the art and I desire therefore in the appended claims to cover all modifications which do not depart from the spirit and scope of my invention.

What is claimed is:

1. An adjustable column comprising two telescoping members, the outer member being tubular, a frusto-conical cam surface on the inner member between the ends thereof, a reduced diameter portion on said inner member joining said cam surface, said cam surface extending radially inwardly from said reduced diameter portion, a plurality of balls lockingly engageable with said cam surface and the inner wall of said outer member, a tripping sleeve surrounding said reduced diameter portion and engageable at one end with said balls, said sleeve being movable relative to both of said members, an extension on said inner member coaxially extending from said cam surface, an annular recess in said extension spaced a given distance from said cam surface, a split locking ring having an outer diameter larger than said extension and loosely mounted in said recess, a retainer on said extension holding said ring in said recess, said ring being radially compressible into a smaller diameter, a solid cross-section locking sleeve surrounding said extension, an annular shoulder at one end of said sleeve which projects radially inwardly, a depressed conically tapered surface on the outer end of said shoulder engageable with said balls on the side opposite said tripping sleeve, the inner wall of said locking sleeve being divided into two different diameter lengths joined by a chamfered surface, the larger diameter length extending from the end of said sleeve opposite said shoulder and having a clearance fit with said locking ring, the smaller diameter length being intermediate the ends of said locking sleeve and having a frictional interference fit with said locking ring, a compressed helical spring surrounding said extension and bearing at one end against said locking ring and at its other end against said shoulder for urging said locking sleeve into engagement with said balls, said larger diameter length surrounding said locking ring when said balls are in locking position and said smaller diameter length surrounding and frictionally engaging said locking ring when said balls are in unlocked position, two annular abutments secured to the opposite end portions respectively of said outer member for selective engagement with said tripping and locking sleeves respectively, said inner member being movable inside said abutment elements, a longitudinally extending groove in said inner member, and a key on said outer member and extending into said groove for preventing relative rotation between said inner and outer members.

2. An adjustable column comprising two relatively movable telescoped members, the outer member being tubular, a frusto-conical cam surface on the inner member between the ends thereof, a reduced diameter portion on said inner member joining said cam surface, said cam surface extending radially inwardly from said reduced diameter portion, a plurality of balls lockingly engageable with said cam surface and the inner wall of said outer member, a tripping sleeve surrounding said reduced diameter portion and engageable at one end with said balls, said sleeve being movable relative to both of said members, an extension on said inner member coaxially extending from said cam surface, an annular recess in said extension spaced a given distance from said cam surface, a split locking ring having a larger diameter than said extension and loosely mounted in said recess, a retainer on said extension holding said ring in said recess, said ring being radially compressible into a smaller diameter, a locking sleeve surrounding said extension, an annular shoulder at one end of said sleeve which projects radially inwardly, a depressed conically tapered surface on the outer end of said shoulder engageable with said balls on the side opposite said tripping sleeve, the inner wall of said locking sleeve being divided into two different diameter lengths joined by a chamfered surface, the larger diameter length extending from the end of said sleeve opposite said ridge and having a clearance fit with said locking ring, the smaller diameter length being intermediate the ends of said locking sleeve and having a frictional interference fit with said locking ring, a compressed helical spring surrounding said extension and bearing at one end against said locking ring and at its other end against said shoulder for urging said locking sleeve into engagement with said balls, said larger diameter length surrounding said locking ring when said balls are in locking position and said smaller diameter length surrounding and frictionally engaging said locking ring when said balls are in unlocked position, and two annular abutments secured to the opposite end portions respectively of said outer member for selective engagement with said tripping and locking sleeves respectively, said inner member being movable inside said abutment elements.

3. The device of claim 1 wherein said balls have a diameter smaller than the radial space between said outer member and said extension.

4. An adjustable column comprising inner and outer relatively movable telescoped members, a frusto-conical cam surface on the inner member between the upper and lower end portions thereof, said inner member being of smaller diameter below said cam surface than above, a plurality of rolling elements lockingly engageable with said cam surface and the inner wall of said outer member, a tripping sleeve surrounding the upper portion of said inner member and engageable at one end with said rolling elements, said sleeve being movable relative to both said members, an annular recess in the lower portion of said inner member at a position remote from said cam surface, a split spring ring loosely received in said recess, a retainer on said inner member holding said ring in said recess, said ring having a larger outer diameter than said lower portion of said inner member, said rolling elements having a diameter smaller than the radial space between said outer member and said lower portion, a locking sleeve surrounding said lower portion freely axially slidable in said outer member, one end of said locking sleeve being engageable with said rolling elements on the side opposite said tripping sleeve, the inner wall of said locking sleeve being divided into two different diameter lengths, the larger diameter length surrounding and clearing said split ring, the smaller diameter length having a frictional interference fit with said split ring, means urging said locking sleeve into engagement with said rolling elements and said rolling elements into locking engagement with said cam surface and said outer member, said larger diameter length clearing said split ring when said rolling elements are in locking position and said smaller diameter length surrounding and frictionally engaging said split ring when said rolling elements are in unlocked position, two abutment elements on said outer member near the opposite ends thereof respectively, and extending radially inwardly toward said inner member, a longitudinally extending groove in the upper portion of said inner member, and a key on said outer member and projecting into said groove for preventing relative rotation between said inner and outer members.

5. An adjustable column comprising inner and outer relatively movable telescoped members, a frusto-conical cam surface on the inner member between the upper and lower end portions thereof, a plurality of rolling elements lockingly engageable with said cam surface and the inner wall of said outer member, a tripping sleeve surrounding the upper portion of said inner member and engageable at one end with said rolling elements, said sleeve being movable relative to both said members, an annular recess in the lower portion of said inner member at a position remote from said cam surface, a split spring ring loosely received in said recess, a retainer on said inner member holding said ring in said recess, said ring having a larger outer diameter than said lower portion of said inner member, a locking sleeve surrounding said lower portion freely axially slidable in said outer member, one end of said locking sleeve being engageable with said rolling elements on the side opposite said tripping sleeve, the inner wall of said locking sleeve being divided into two different diameter lengths, the larger diameter length surrounding and clearing said split ring, the smaller diameter length having a frictional interference fit with said split ring, means urging said locking sleeve into engagement with said rolling elements and said rolling elements into locking engagement with said cam surface and said outer member, said larger diameter length clearing said split ring when said rolling elements are in unlocked position, and two abutment elements on said outer member near the opposite ends thereof respectively and extending radially inwardly toward said inner member.

6. An adjustable column comprising inner and outer relatively movable telescoped members, a frusto-conical cam surface on the inner member between the upper and lower end portions thereof, a plurality of rolling elements lockingly engageable with said cam surface and the inner wall of said outer member, a tripping sleeve surrounding the upper portion of said inner member and engageable at one end with said rolling elements, said sleeve being movable relative to both said members, a split spring ring which is radially compressible mounted on said lower portion, said ring having a larger outer diameter than said lower portion of said inner member, a locking sleeve surrounding said lower portion freely axially slidable in said outer member, one end of said locking sleeve being engageable with said rolling elements on the side opposite said tripping sleeve, the inner wall of said locking sleeve being divided into two different diameter lengths, the larger diameter length surrounding and clearing said split ring, the smaller diameter length having a frictional interference fit with said split ring, means urging said locking sleeve into engagement with said rolling elements and said rolling elements into locking engagement with said cam surface and said outer member, said larger diameter length clearing said split ring when said rolling elements are in unlocked position, and two abutment elements on said outer member near the opposite ends thereof respectively, and extending radially inwardly toward said inner member.

7. An adjustable column comprising inner and outer relatively movable telescoped members, a frusto-conical cam surface on the inner member between the upper and lower end portions thereof, a plurality of rolling elements lockingly engageable with said cam surface and the inner wall of said outer member, a tripping sleeve surrounding the upper portion of said inner member and engageable at one end with said rolling elements, said sleeve being movable relative to both said members, a split spring ring which is radially compressible mounted on said lower portion, said ring having a larger outer diameter than said lower portion of said inner member, a locking sleeve surrounding said lower portion freely axially slidable in said outer member, one end of said locking sleeve being engageable with said rolling elements on the side opposite said tripping sleeve, the inner wall of said locking sleeve having a frictional interference fit with said split ring, means urging said locking sleeve into engagement with said rolling elements and said rolling elements into locking engagement with said cam surface and said outer member, and two abutment elements on said outer member near the opposite ends thereof respectively and extending radially inwardly toward said inner member.

8. An adjustable column comprising inner and outer telescoping members, a tapered cam surface on the inner member between the upper and lower end portions extending inwardly from the periphery thereof, at least one rolling element lockingly engageable with said cam surface and said outer member, a tripping element interposed between and relatively movable with respect to the upper portions of said telescoping members, said tripping element being engageable with said rolling element, a split spring ring which is radially compressible mounted on the lower portion of said inner member, the outer diameter of said ring being larger than said lower portion, a locking sleeve surrounding said lower portion and being engageable with said rolling element, said sleeve being movable in said outer member, the inner wall of said sleeve being axially divided into two different diameter lengths, the larger diameter length having a clearance fit with said ring, the smaller diameter portion having a frictional fit with said ring, and means selectively forcing said tripping element and said locking sleeve into engagement with said rolling element.

9. An adjustable column comprising inner and outer telescoping members, a tapered cam surface on the inner member between the upper and lower end portions extending inwardly from the periphery thereof, at least one rolling element lockingly engageable with said cam surface and said outer member, a tripping element interposed between and relatively movable with respect to the upper portions of said telescoping members, said tripping element being engageable with said rolling element, friction means on said lower portion which extends radially into the space between said inner and outer members, means yieldably urging said friction means radially outwardly, a locking sleeve surrounding said lower portion and being engageable with said rolling element, said sleeve being movable in said outer member, the inner wall of said sleeve being axially divided into two different lengths, the larger diameter length having a clearance fit with said friction means, the smaller diameter portion having a frictional fit with said friction means, and means selectively forcing said tripping element and said locking sleeve into engagement with said rolling element.

10. An adjustable column comprising inner and outer telescoping members, a tapered cam surface on the inner member between the upper and lower end portions extending inwardly from the periphery thereof, at least one rolling element lockingly engageable with said cam surface and said outer member, a tripping element interposed between and relatively movable with respect to the upper portions of said telescoping members, said tripping element being engageable with said rolling element, friction means on said lower portion of said inner member which extends radially into the space between said inner and outer members, means yieldably urging said friction means radially outwardly, a locking sleeve surrounding said lower portion of said inner member and being engageable with said rolling element, said sleeve having a frictional fit with said friction means, and means selectively forcing said tripping element and said locking sleeve into engagement with said rolling elements.

11. An adjustable column comprising inner and outer telescoping members, a tapered cam surface on the inner member between the upper and lower end portions extending inwardly from the periphery thereof, at least one rolling element lockingly engageable with said cam surface, tripping and locking means comprising tripping and locking sections interposed between and relatively movable with respect to said inner and outer members, said tripping and locking means having means intermediate said sections for retaining said rolling element, said tripping section surrounding said upper portion of said inner member, friction means on said lower portion of said inner member which extends radially into the space between said inner and outer members, means yieldably urging said friction means radially outwardly, said locking section surrounding said lower portion of said inner member and having a frictional fit with said friction means, and means selectively forcing said tripping and locking means in opposite directions thereby selectively moving said rolling element into and out of engagement with said cam surface.

12. An adjustable column comprising inner and outer telescoping members, said inner member having a tapered cam surface between its upper and lower end portions extending inwardly from the periphery thereof, at least one rolling element lockingly engageable with said cam surface, a unitary tripping and locking sleeve member interposed between and relatively movable with respect to said telescoping members and comprising tripping and locking sections, said sleeve member having means intermediate said sections retaining said rolling element, said tripping section of said sleeve member surrounding said upper portion of said inner member, friction means on said lower portion of said inner member which extends radially into the space between said inner and outer members, said locking section of said sleeve member surrounding said lower portion of said inner member and having a frictional fit with said friction means, and means selectively forcing said tripping and locking sleeve member in opposite directions thereby moving said rolling element into and out of engagement with said cam surface.

13. An adjustable column comprising inner and outer telescoping members, said inner member having a tapered cam surface between its upper and lower end portions extending inwardly from the periphery thereof, a plurality of balls lockingly engageable with said cam surface and said outer member, a unitary tripping and locking sleeve member interposed between and relatively movable with respect to said telescoping member and comprising tripping and locking sections, said sleeve member having a plurality of spaced openings formed therethrough intermediate said sections respectively retaining said balls, said tripping section of said sleeve member surrounding said upper portion of said inner member, yieldable annular friction means on said lower portion of said inner member and extending radially into the space between said inner and outer members, said locking section of said sleeve member surrounding said lower portion of said inner member and having its inner wall divided axially into two different diameter lengths joined by a chamfered surface, the larger diameter length extending from the end of said locking section remote from said balls and having a clearance fit with said friction means, the smaller diameter length being adjacent said balls and having a frictional fit with said friction means, means urging said sleeve member so that said balls are in locking engagement with said cam surface and said outer member, said larger diameter length of said locking section clearing said friction means when said balls are in locking position and said smaller diameter length frictionally engaging said friction means when said balls are in unlocked position, and abutment means respectively secured to opposite end portions of said outer member for selectively engaging the opposite ends of said tripping and locking sleeve member thereby selectively to move said balls into and out of engagement with said cam surface.

14. An adjustable column comprising inner and outer telescoping members, said inner member having a frustoconical cam surface between the upper and lower end portions thereof, said upper end portion having a reduced diameter portion joining said cam surface, said lower end portion having a smaller diameter than said reduced diameter portion, a plurality of balls lockingly engageable with said cam surface and the inner wall of said outer member, said balls respectively having a diameter less than the radial space between the inner wall of said outer member and said lower end portion of said inner member, a unitary tripping and locking sleeve member interposed between and relatively movable with respect to said telescoping members and comprising tripping and locking sections, said sleeve member having a plurality of spaced openings formed therethrough intermediate said sections for retaining said balls, said tripping section of said sleeve member surrounding said reduced diameter portions of said inner member, said lower portion of said inner member having an annular recess formed therein spaced from said cam surface, a split spring locking ring having an outside diameter larger than said lower portion and loosely mounted in said recess, said locking ring being radially compressible into a smaller diameter, said locking section surrounding said lower portion of said inner member and said locking ring, said locking section having an annular shoulder formed on its inner wall adjacent said openings, said inner wall of said locking section being axially divided into two different diameter lengths joined by a chamfered surface, the larger diameter length extending from the end of said locking section remote from said openings and having a clearance fit with said locking ring, the smaller diameter length being adjacent said shoulder and having a frictional interference fit with said locking ring, a compressed helical spring surrounding said extension and bearing at one end against said locking ring and its other end against said shoulder for urging said sleeve member so that said balls are in locking engagement with said cam surface and the inner wall of said outer member, said larger diameter length of said locking section clearing said locking ring when said balls are in locking engagement with said cam surface, and said smaller diameter length surrounding and fricitionally engaging said locking ring when said balls are out of locking engagement with said cam surface, two annular abutments secured to opposite end portions respectively of said outer member for selective engagement with the opposite ends respectively of said sleeve member thereby selectively to move said balls into and out of engagement with said cam surface.

References Cited in the file of this patent

UNITED STATES PATENTS

| | | |
|---|---|---|
| 1,253,983 | Kuebler | Jan. 15, 1918 |
| 1,284,351 | Jagielo | Nov. 12, 1918 |
| 1,407,570 | Peirce | Feb. 21, 1922 |
| 2,010,292 | Campbell | Aug. 6, 1935 |
| 2,314,208 | Gurewitsch | Mar. 16, 1943 |
| 2,615,735 | Heimann et al. | Oct. 28, 1952 |
| 2,872,223 | Shearman et al. | Feb. 3, 1959 |